United States Patent
Hughes, Sr. et al.

(10) Patent No.: US 6,604,485 B1
(45) Date of Patent: Aug. 12, 2003

(54) DRIVABLE POST AND MARKER

(75) Inventors: Robert K. Hughes, Sr., Fort Myers, FL (US); Robert K. Hughes, Jr., Fort Myers, FL (US)

(73) Assignee: Flexstake, Inc., Fort Meyers, FL (US)

( * ) Notice: Subject to any disclaimer, the term of this patent is extended or adjusted under 35 U.S.C. 154(b) by 0 days.

(21) Appl. No.: 10/086,235

(22) Filed: Feb. 27, 2002

(51) Int. Cl.⁷ .............................................. G01D 21/00
(52) U.S. Cl. ........................... 116/209; 52/155; 52/156
(58) Field of Search ............................... 116/200, 209; 52/155, 156, 158, 160, 165

(56) References Cited

U.S. PATENT DOCUMENTS

| | | | | |
|---|---|---|---|---|
| 444,331 A | * | 1/1891 | Christ | 52/156 |
| 3,371,647 A | * | 3/1968 | Shopbell | 116/209 |
| 3,621,806 A | * | 11/1971 | Brown | 52/160 |
| 3,991,976 A | * | 11/1976 | Skinner | 254/30 |
| 4,862,823 A | | 9/1989 | Hughes | 116/209 |
| 5,009,394 A | * | 4/1991 | Marshall | 254/30 |
| 5,104,265 A | * | 4/1992 | Halloran, Jr. | 52/165 |
| 5,356,134 A | * | 10/1994 | DeMatteo | 116/209 |
| 5,396,743 A | * | 3/1995 | Bellette | 52/155 |
| 5,515,645 A | * | 5/1996 | Gober | 52/156 |
| 5,568,785 A | * | 10/1996 | Hazen | 116/209 |

* cited by examiner

Primary Examiner—Christopher W. Fulton
Assistant Examiner—Amanda J Hoolahan
(74) Attorney, Agent, or Firm—Bracewell & Patterson, L.L.P.

(57) ABSTRACT

An anchor system for flexible marker posts comprises an anchor that receives a post before the anchor is driven into the ground. In a first embodiment, a flat, rectangular plate of mild steel is folded into a U-shape with parallel upper and lower plates. The lower end of a post is placed within the anchor, and the anchor is driven into the earth with a bladed driver, the anchor bending into a V-shape along an axis defined by the blade of the driver. The anchor retains the post with friction, and the anchor is retained in the earth by mechanical interference and friction. Additional embodiments include plates that are pre-bent into a V-shape, tabs for maintaining separation of the plates, and a one-piece anchor having a V-shaped lower portion and coplanar, horizontal, upper surfaces connected to the upper edges of the lower portion.

19 Claims, 4 Drawing Sheets

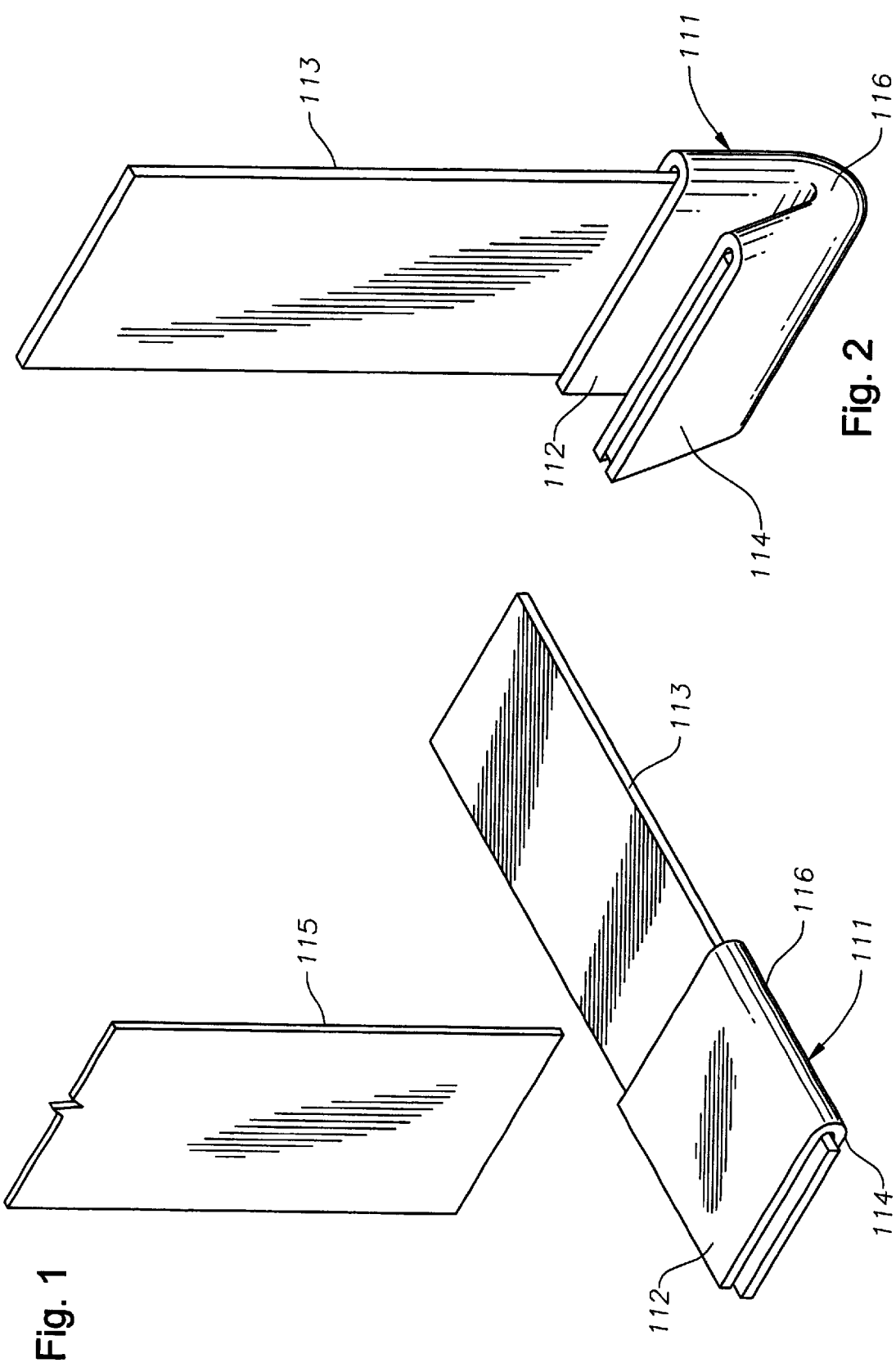

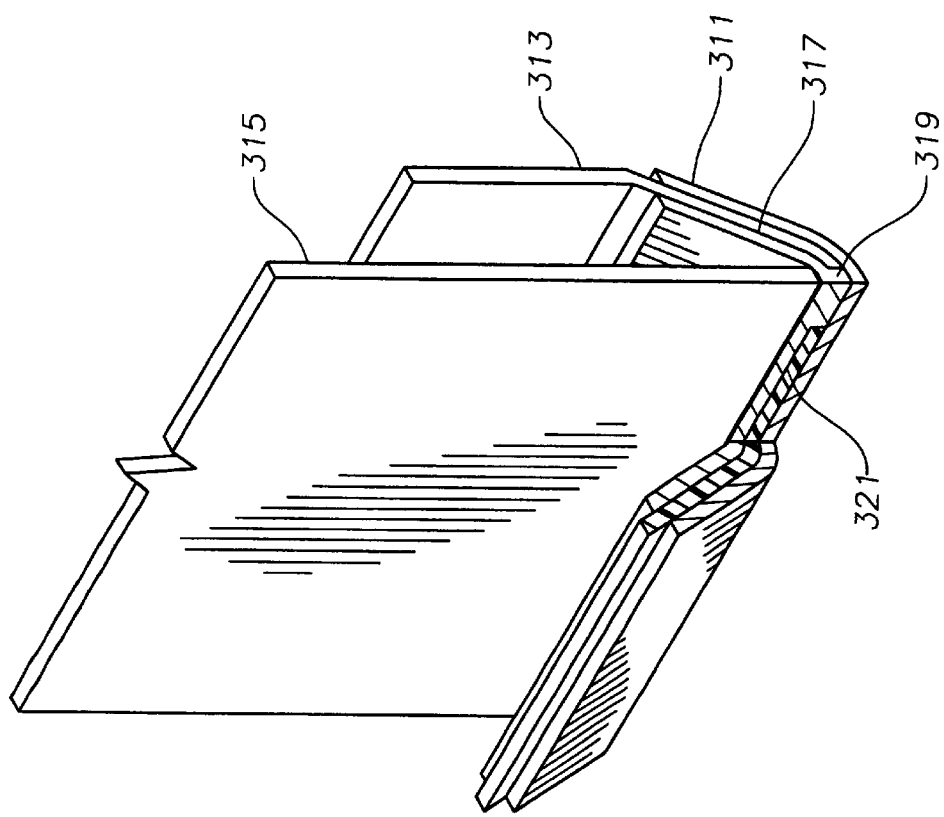
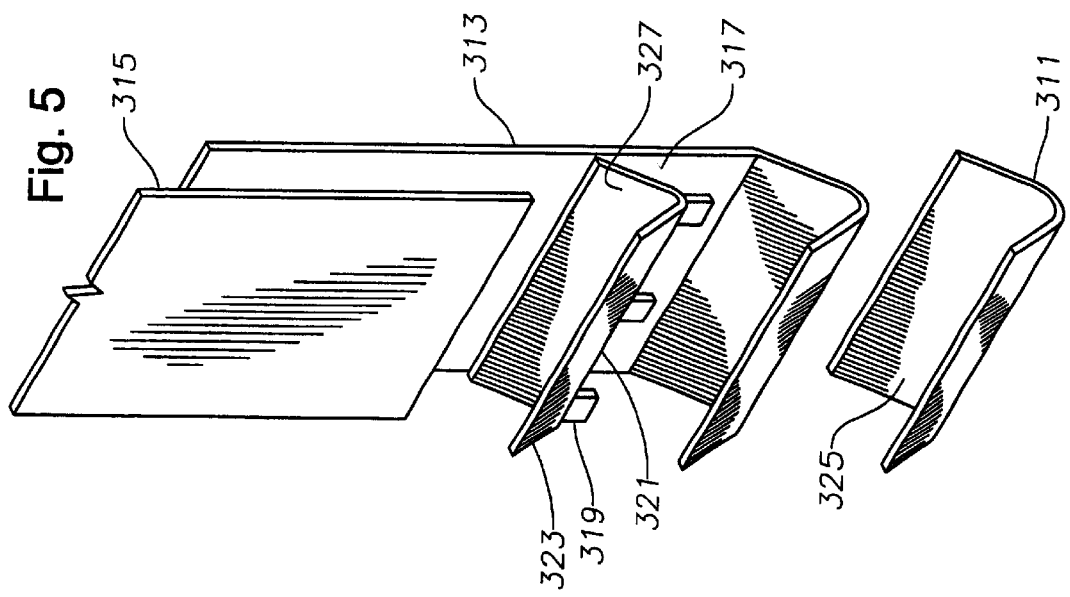

DRIVABLE POST AND MARKER

BACKGROUND OF THE INVENTION

1. FIELD OF THE INVENTION

The present invention relates generally to installation of flexible marker posts and, more specifically, to anchor systems for retaining the posts in earth.

2. DESCRIPTION OF THE RELATED ART

Markers are often used in places, such as along roadsides, where there is a likelihood that the mark will be struck or hit by a passing object. Because of the costs of replacing damaged markers, the markers are preferably constructed so that they can withstand the force imparted by passing objects without being severely damaged. Markers are also widely used on playing fields, earthen fields, and grassy areas to mark boundaries, mark locations, or provide information. They may be used on football fields, soccer fields, baseball fields, golf courses, running tracks and trails, public parks, and private lawns.

Typical flexible posts have been constructed to have a base attached to the support surface and having the post mounted on the base. For example, U.S. Pat. No. 4,862,823 shows posts in which an elastomeric element connects a marker post to a base or support, enabling the post to bend relative to the base at the elastomeric element when struck. However, installation of a base adds additional cost to the post and increases installation time. Therefore, there is a need for anchor systems and a method of use for providing inexpensive, easy, and quick installations of flexible marker posts.

BRIEF SUMMARY OF THE INVENTION

An anchor system for flexible marker posts comprises an anchor that receives a post before the anchor is driven into the ground. In a first embodiment, a flat, rectangular plate of mild steel is folded into a U-shape with parallel upper and lower plates. The lower end of a post is placed with the anchor, and the anchor is driven into the earth with a bladed driver, the anchor bending along an axis defined by the blade of the driver. The anchor retains the post with friction, and the anchor is retained in the earth by mechanical interference and friction.

A second embodiment of the invention provides for a two-piece anchor comprising two flat plates. The lower end of the post is placed between the plates, and the anchor is then driven into the ground with a bladed driver.

A third embodiment of the invention also uses a two-piece anchor, though the plates of the anchor are pre-bent during manufacture. The upper plate has tabs that pierce the post during installation, the post sliding upward on the tabs as the anchor is driven into the earth. The lower end of the tabs are in metal-to-metal contact with the lower plate, and the tabs secure the post within the anchor.

A fourth embodiment of the invention is a flat steel plate folded along three longitudinal axes to form a V-shaped lower section and horizontal surfaces at the upper portion of the lower section. The lower portion and surfaces form an enclosure that receives the post, then the anchor is driven into the earth with the blade along a lateral line.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

FIG. 1 is a perspective view of a three-piece drivable anchor system for installing a marker post in the ground and shown prior to installation, the anchor system being constructed in accordance with the present invention.

FIG. 2 is a perspective view of the post guide and post from FIG. 1, the post guide having been bent.

FIG. 5 is an exploded perspective view of a third embodiment of an anchor system for installing a marker post in the ground, the anchor system being constructed in accordance with the present invention.

FIG. 6 is a partially-sectioned perspective view of the anchor system of FIG. 5 showing the position of the components during installation;

DETAILED DESCRIPTION OF THE INVENTION

Figure 4:
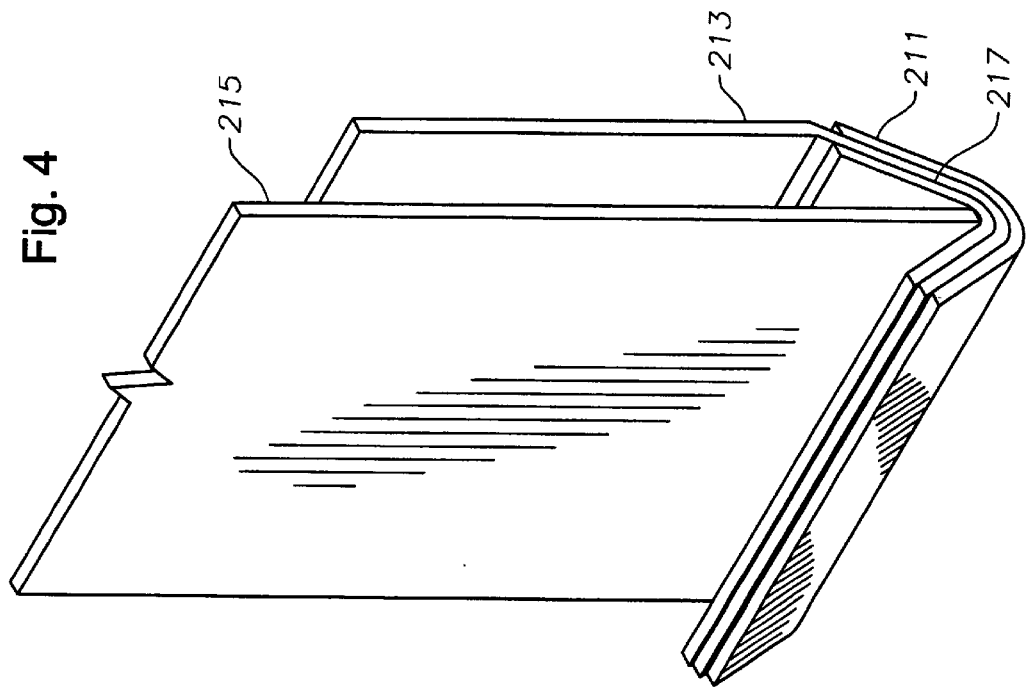
FIG. 4 is a perspective view of the anchor system of FIG. 3 with the post guide and insert being bent and the driver positioned for installation of the anchor system.

FIGS. 1 through 7 show three embodiments of an anchor system for a flexible marker post installed in the ground. The posts are used primarily along roadways to mark the edges of lanes or for other forms of traffic control. Though not required, the anchor systems are preferably installed in a pre-dug hole and rely on friction with the ground and the weight of dirt filled into the hole above the installed anchor to hold the post and anchor in place. The components of each system are made from sheet steel and may be flat or bent. This system provides a simple installation method and protects the lower end of the post while it is being installed.

FIGS. 1 and 2 depict a three-piece flat anchor system comprising a post anchor 111 having a U-shaped cross-section, a plastic post 113, and a driver 115 for installing post 113 and anchor 111 into the ground. Post anchor 111 is preferably formed by bending a wide, rectangular sheet of steel along its central longitudinal axis to form the U-shape. Post anchor 111 has an upper surface 112, a lower surface 114, and bent side edge 116. The other side edge of anchor 111 is open. Plastic post 113 is rectangular and has a width in one embodiment that is ¼" to ½" narrower than post anchor 111. Post 113 is flexible and is formed of an elastomeric material. The inner and outer surfaces of anchor 111 surround the lower portion of post 113. Post 113 is a preferably-flat strip having a width greater than its thickness. Driver 115 is a long, flat, rectangular plate also preferably made of steel and which is narrower than post anchor 111, but any tool with a flat lower edge, preferably measuring a minimum of 4" by ¼", can be used to drive the anchor system into the ground.

To install post 113 in the ground, a hole is preferably dug having a width of 4" and a depth of 18" for the abovedimensioned post anchor 111. The full width of the lower end of plastic post 113 is inserted into the open edge of post anchor 111, and the assembled post anchor 111 and post 113 are laid across the hole, the width and length of post anchor 111 being centered over the hole. Post 113 should be oriented so that it faces the desired direction after installation. The flat lower end of driver 115 is placed against the top of upper surface 112 of post anchor 111, and driver 115 is forced downward to push the assembly into the hole. As post anchor 111 is driven into the hole, the force of the ground opposing the insertion causes the two longitudinal ends to bend upward around a generally-central lateral axis, as shown in FIG. 2, the axis defined by the position of the lower edge of driver 115. The lower portion of post 113 bends with post anchor 111 as it is sandwiched between surfaces 112, 114. This causes post 113 to stand upright and in the correct position once post anchor 111 has been driven into the hole.

Figure 8:
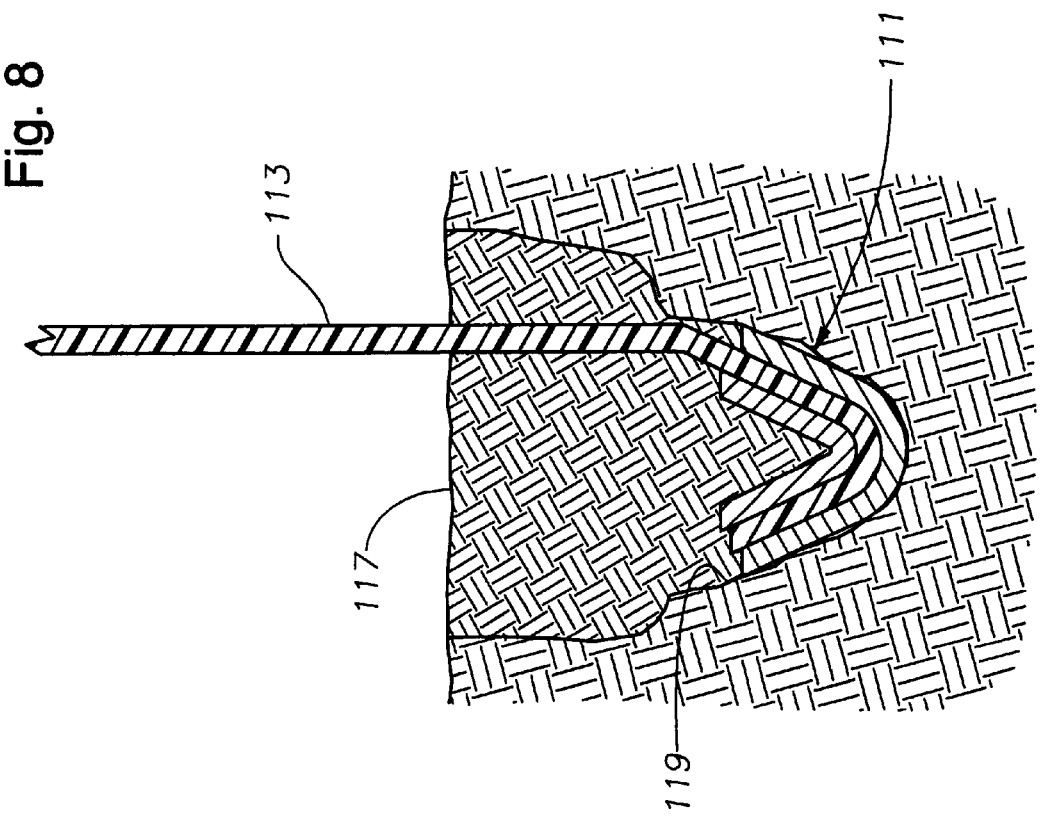
FIG. 8 is a cross-sectional view of the anchor system of FIG. 1 installed in the ground.

To complete the installation, driver 115 is removed, and the hole is filled by placing dirt 117 on top of post anchor 111 as shown in FIG. 8. The friction between post 113 and the inner surface of post anchor 111 retains post 113 within post anchor 111. The weight of dirt 117, the friction between the outer surface of post anchor 111 and walls 119 of the hole, and the angle of the longitudinal ends of post anchor 111 relative to vertical walls 119 of the hole combine to retain post anchor 111 in the ground.

Post anchor 111 can be bent along a central lateral axis during fabrication or prior to installation to produce a V-shape as shown in FIG. 2. This would ease alignment and initial insertion, but would require an additional step in manufacturing post anchor 111.

Figure 3:
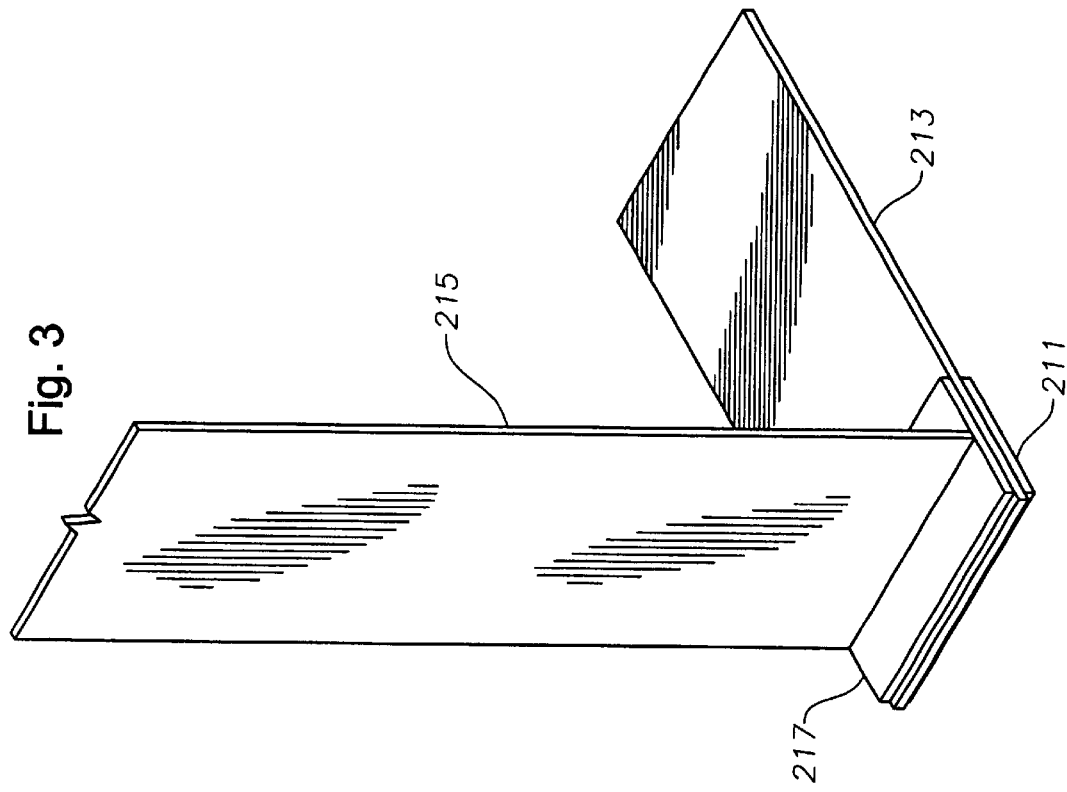
FIG. 3 is a perspective view of a second embodiment of an anchor system for installing a marker post in the ground and shown prior to installation, the anchor system being constructed in accordance with the present invention.

A second embodiment of the anchor system is shown in FIGS. 3 and 4. This system is a four-piece flat design comprising a post guide 211, a post 213, a driver 215, and an insert 217. Post guide 211 and insert 217 are flat, rectangular sheets of steel with a horizontal area approximately equal to that of post anchor 111 shown in FIGS. 1 and 2. Driver 215 is the same as that in the first embodiment, and installation follows the same procedure as described above. Post guide 211 and insert 217 are placed on opposite sides of a lower portion of post 213. As shown in FIG. 4, these components also may be bent along a central lateral axis prior to insertion in the ground, forming a V-shaped trough having upward- and outward-extending legs.

FIGS. 5 and 6 show a third embodiment of the present invention comprising four pieces. Shown in FIG. 5 are rectangular tabs 319 depending from the lower surface of insert 317 along the central lateral axis. Insert 317 and post guide 311 are preferably bent during fabrication or prior to installation to assist in aligning the components to each other and to reduce the possibility that tabs 319 will be bent during installation. The lower end of plastic post 313 is positioned in post guide 311, and insert 317 is placed onto the upper surface of the post 313 with tabs 319 in contact with post 313. Tabs 319 cut through plastic post 313 as the assembly is driven into the ground, and post 313 slides upward into notches 321 between tabs 319. This provides a metal-to-metal contact between tabs 319 and post guide 311 and protects post 313 from being damaged by the force between a lower surface 323 of insert 317 and an upper surface 325 of post guide 311. Tabs 319 do not extend through post guide 311.

Installation using a pre-bent anchor system is similar to that of the systems using flat components. Post guide 311 is inserted into the hole with the V-shape opening upward and the lateral axis perpendicular to the desired direction to which a front side of post 313 will be exposed. The lower end of post 313 is lowered into the hole and inserted in post guide 311. Insert 317 is placed into the hole and onto post 313 with the same orientation as post guide 311. The lower edge of driver 315 is placed against the vertex of the V-shape on an upper surface 327 of insert 317 with the lateral axis of driver 315 being parallel to that of insert 317. Driver 315 is forced downward to push the assembly into the ground.

Figure 7:
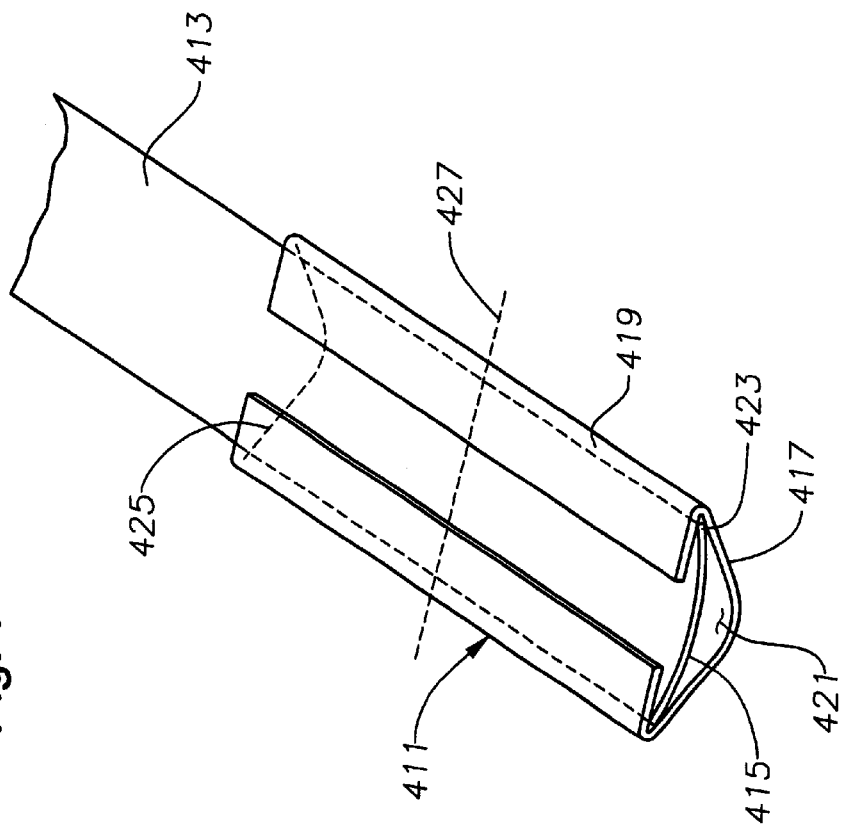
FIG. 7 is a perspective view of a fourth embodiment of an anchor system for installing a marker post in the ground, the anchor system being constructed in accordance with the present invention.

A fourth embodiment of an anchor system of the invention is shown in FIG. 7. This system is a three-piece design comprising a post anchor 411, a post 413, and a driver (not shown). Post 413 is shown as having a curved front surface 415, though post 413 may alternatively have a flat front surface 415. Post anchor 411 is a rectangular sheet of preferably mild steel that is bent along three longitudinal axes to form a V-shaped lower portion 417 and coplanar, horizontal, longitudinal surfaces 419 connected along the upper edges of lower portion 417. The V-shape of lower portion 417 is a trough having upward- and outward-extending legs, the trough opening upward. Surfaces 419 extend inward from the upper edges of lower portion 417 and toward each other. In this embodiment, surfaces 419 do no touch each other, but surfaces 419 and lower portion 417 partially surround an enclosure 421 having open ends 423, 425 and being sized for receiving post 413.

To install post 413 using post anchor 411, post 413 is inserted into enclosure 421. A pilot hole is created in the earth as described above, then anchor 411 is placed over the hole, anchor 411 being generally centered over the hole. A flat-bladed driver, such as that shown in previously-described embodiments, is used to drive anchor 411 into the earth. For best results, the blade of the driver preferably contacts anchor 411 approximately along line 427. As anchor 411 is driven into the earth, the longitudinal ends of anchor 411 are bent upwards around line 427 (or wherever the blade of the driver contacts anchor 411), producing a V-shape having a lateral axis, and post 413 assumes a vertical orientation. As described above, friction between post 413 and the inner surfaces of anchor 411 retains post 413 within anchor 411, and mechanical interference and friction with the earth retains anchor 411 within the hole.

The invention provides for several advantages. Using the anchor systems of the invention makes the installation of flexible posts both easy and quick, typically allowing one person to install a post in less than two minutes. Since the anchor systems are hidden underground, they are tamper resistant. The anchor systems also provide an installation that strongly resists the post being pulled out of the ground.

While the invention has been shown in only one of its forms, it is not thus limited but is susceptible to various changes and modifications without departing from the spirit thereof. For example, in some cases, sufficient force may be applied by the driver to insert the anchor and lower end of the post into the ground without digging a hole in advance. Also, posts could be automatically installed from a vehicle that continuously moves along the desired path.

We claim:

1. A marker, comprising:
   a post;
   upper and lower plates, the plates being generally parallel to each other; and wherein
   a lower portion of the post is placed between the plates prior to the plates being simultaneously driven into earth, the plates and the lower portion of the post having a V-shape after installation.

2. The device of claim 1, wherein:

the plates are bent along a line generally perpendicular to a longitudinal axis of the post.

3. The device of claim 1, wherein:

the plates are formed of steel; and the post is flexible and elastomeric.

4. The device of claim 1, wherein:

the plates are joined to each other along at least one folded-over side edge, a vertex of the V-shape of the plates being perpendicular to the side edge connecting the plates.

5. The device of claim 1, further comprising:

a plurality of tabs depending from the upper plate to the lower plate, the tabs maintaining a selected distance between the plates and extending through the lower portion of the post.

6. The device of claim 1, wherein:

the plates are joined to each other along two parallel, folded-over side edges.

7. The device of claim 1, wherein:

the V-shape of the plates defines a lower vertex and two upper edges, a vertical dimension from the vertex to the upper edges being less than a width from one side edge of the plates to the other side edge of the plates.

8. A flexible marker, comprising:

a flexible, elastomeric post;

upper and lower metal plates, the plates being generally parallel and connected to each other along at least one folded-over side edge; and wherein a lower portion of a flexible marker post is sandwiched between the plates prior to the plates being simultaneously driven into earth, the plates having a V-shape after installation that defines a lower vertex and two upward- and outward-extending legs, the vertex being perpendicular to a longitudinal axis of the marker, the post extending upward from one of the legs.

9. The anchor of claim 8, wherein:

the vertex of the V-shape is perpendicular to the folded-over side edges.

10. The anchor device of claim 8, wherein:

a plurality of tabs depending from the upper plate to the lower plate, the tabs maintaining a selected distance between the plates and extending through the lower portion of the post.

11. The device of claim 8, wherein:

the plates are joined to each other along two parallel, folded-over side edges.

12. The device of claim 8, wherein:

the V-shape of the plates defines a lower vertex and two upper edges, a vertical dimension from the vertex to the upper edges being less than a width from one side edge of the plates to the other side edge of the plates.

13. The device of claim 8, wherein:

a lower portion of the post is a solid strip having a width greater than its thickness.

14. A method of installing a marker post, the method comprising:

inserting a lower portion of a post between parallel plates of an anchor;

bending the plates and lower portion of the post to define a V-shape trough with a lower vertex and upward- and outward-extending legs, the post extending upward from the trough; and engaging an upper side of the trough between the legs with a blade of a tool and pressing the trough downward into the earth.

15. The method of claim 14, wherein:

the plates and lower portion of the post are bent into the trough prior to insertion into the earth.

16. The method of claim 14, wherein:

the plates and lower portion of the post are bent into the trough simultaneously while inserting the trough into the earth.

17. The method of claim 14, further comprising:

digging a hole in the earth prior to insertion of the trough into the earth.

18. The method of claim 14, further comprising:

covering the trough with earth after insertion of the trough into the earth.

19. A method of installing a post, the method comprising:

inserting a lower portion of a post into an anchor, the post being located between a lower plate, and coplanar, horizontal, upper plates attached to longitudinal upper edges of the lower plate, the lower plate having a concave lateral cross-section;

placing the anchor on an installation surface, the upper plates being parallel to the support surface; and driving the anchor downward into the support surface with a bladed tool that is placed against top surfaces of the upper plates, the upper and lower plates bending into a V-shape as the anchor is driven into the support surface, the V-shape having a vertex defined by a blade of the tool.

\* \* \* \* \*